US012699764B2

(12) United States Patent
Bellam et al.

(10) Patent No.: US 12,699,764 B2
(45) Date of Patent: Aug. 4, 2026

(54) CERTIFICATE RESILIENCY VALIDATION USING CHAOS ENGINEERING

(71) Applicant: Microsoft Technology Licensing, LLC, Redmond, WA (US)

(72) Inventors: Ravi Teja Bellam, Monroe, WA (US); Rohith Reddy Gundreddy, Redmond, WA (US); Kaitlyn Yuchen S. Yang, Seattle, WA (US); Christopher G. Ashton, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 691 days.

(21) Appl. No.: 18/123,621

(22) Filed: Mar. 20, 2023

(65) Prior Publication Data

US 2024/0320318 A1 Sep. 26, 2024

(51) Int. Cl.
*G06F 21/44* (2013.01)
*G06F 21/45* (2013.01)

(52) U.S. Cl.
CPC .............. *G06F 21/45* (2013.01); *G06F 21/44* (2013.01)

(58) Field of Classification Search
CPC ................................. G06F 21/45; G06F 21/44
See application file for complete search history.

(56) References Cited

U.S. PATENT DOCUMENTS

| | | | | |
|---|---|---|---|---|
| 10,708,256 | B1 * | 7/2020 | Kane-Parry | ......... H04L 63/0823 |
| 12,361,110 | B1 * | 7/2025 | Subramanian | .......... G06F 21/33 |
| 2019/0306193 | A1 * | 10/2019 | Tian | .................... G06F 11/3688 |
| 2024/0073032 | A1 * | 2/2024 | Sterbling | .............. G06F 21/606 |

* cited by examiner

*Primary Examiner* — Amie C. Lin

(74) *Attorney, Agent, or Firm* — Schwegman Lundberg & Woessner, P.A.

(57) ABSTRACT

Generally discussed herein are devices, systems, and methods for certificate management resiliency validation. A method can include receiving, at a resiliency tester of a cloud network, experiment data defining a certificate management resilience experiment to be performed on a resource of the cloud network, accessing, by the resiliency tester and a fault library and based on the experiment data, one or more faults that implement the certificate management resilience experiment, altering, by the resiliency tester and based on the experiment data, an attribute of a certificate, a version of the certificate, accessibility to a secrets vault that houses the certificate, or a combination thereof resulting in a modified certificate or modified certificate availability, and altering a certificate management tool based on telemetry data regarding access of the modified certificate.

20 Claims, 8 Drawing Sheets

700

770 — RECEIVE EXPERIMENT DATA DEFINING A CERTIFICATE MANAGEMENT RESILIENCE EXPERIMENT TO BE PERFORMED ON A RESOURCE OF THE CLOUD NETWORK

772 — ACCESS, BY A FAULT LIBRARY AND BASED ON THE EXPERIMENT DATA, ONE OR MORE FAULTS THAT IMPLEMENT THE CERTIFICATE MANAGEMENT RESILIENCE EXPERIMENT

774 — ALTER, BASED ON THE EXPERIMENT DATA, AN ATTRIBUTE OF A CERTIFICATE, A VERSION OF THE CERTIFICATE, ACCESSIBILITY TO A SECRETS VAULT THAT HOUSES THE CERTIFICATE, OR A COMBINATION THEREOF RESULTING IN A MODIFIED CERTIFICATE OR MODIFIED CERTIFICATE AVAILABILITY

776 — EXECUTE AN APPLICATION THAT OPERATES USING CERTIFICATE MANAGEMENT CODE THAT RELIES ON ACCESS TO THE MODIFIED CERTIFICATE OR MODIFIED CERTIFICATE AVAILABILITY

778 — MONITOR EXECUTION OF THE APPLICATION

780 — ALTER THE CERTIFICATE MANAGEMENT CODE BASED ON THE MONITORING

*FIG. 7*

CERTIFICATE RESILIENCY VALIDATION USING CHAOS ENGINEERING

BACKGROUND

According to the second-annual state of Machine Identity Management Report 2022, conducted jointly by Keyfactor of Independence Ohio, United States and Ponemon Institute of Traverse City Michigan, United States, 81% of the organizations have experienced at least two or more disruptive outages caused by expired certificates in the past two years. Certificate expiry is just one of many in a class of certificate outages. Certificate outages at the client or service layer not only cause outages but could lead to serious breaches like a recent Mimecast certificate attack. Certificate outages affect both customers and employees, causing loss of customer trust, impact to revenue and employee (site reliability engineer (SRE), software engineer (SWE), product manager (PM)) burn outs from dealing with issues.

SUMMARY

A method, device, or a machine-readable medium for certificate management resiliency testing are provided. A method can include receiving experiment data defining a certificate management resilience experiment to be performed on a resource of the cloud network. The method can include accessing, by a fault library and based on the experiment data, one or more faults that implement the certificate management resilience experiment. The method can include altering, based on the experiment data, an attribute of a certificate, a version of the certificate, accessibility to a secrets vault that houses the certificate, or a combination thereof resulting in a modified certificate or modified certificate availability. The method can include executing an application that operates using certificate management code that relies on access to the modified certificate or modified certificate availability. The method can include monitoring execution of the application. The method can include altering the certificate management code based on the monitoring.

The one or more faults can comprise a disabled certificate fault, a secrets vault unavailable fault, or a certificate attribute alteration fault. The certificate attribute fault can alter a certificate attribute value. The certificate attribute comprises one or more of a key size, content type, certificate name, or key type of the certificate. The one or more faults can comprise a fault that alters a version number of the certificate. The one or more faults can comprise a fault that alters a validity period of the certificate. The experiment can ensure that certificate validation is performed based on only (i) whether an issuer is on a list of valid issuers and (ii) subject name of the certificate matches a pre-defined string. A device, machine-readable medium, or system can be configured to implement the method.

BRIEF DESCRIPTION OF DRAWINGS

FIG. 7 illustrates, by way of example, a block diagram of an embodiment of a method for certificate management code validation.

DETAILED DESCRIPTION

Figure 1:
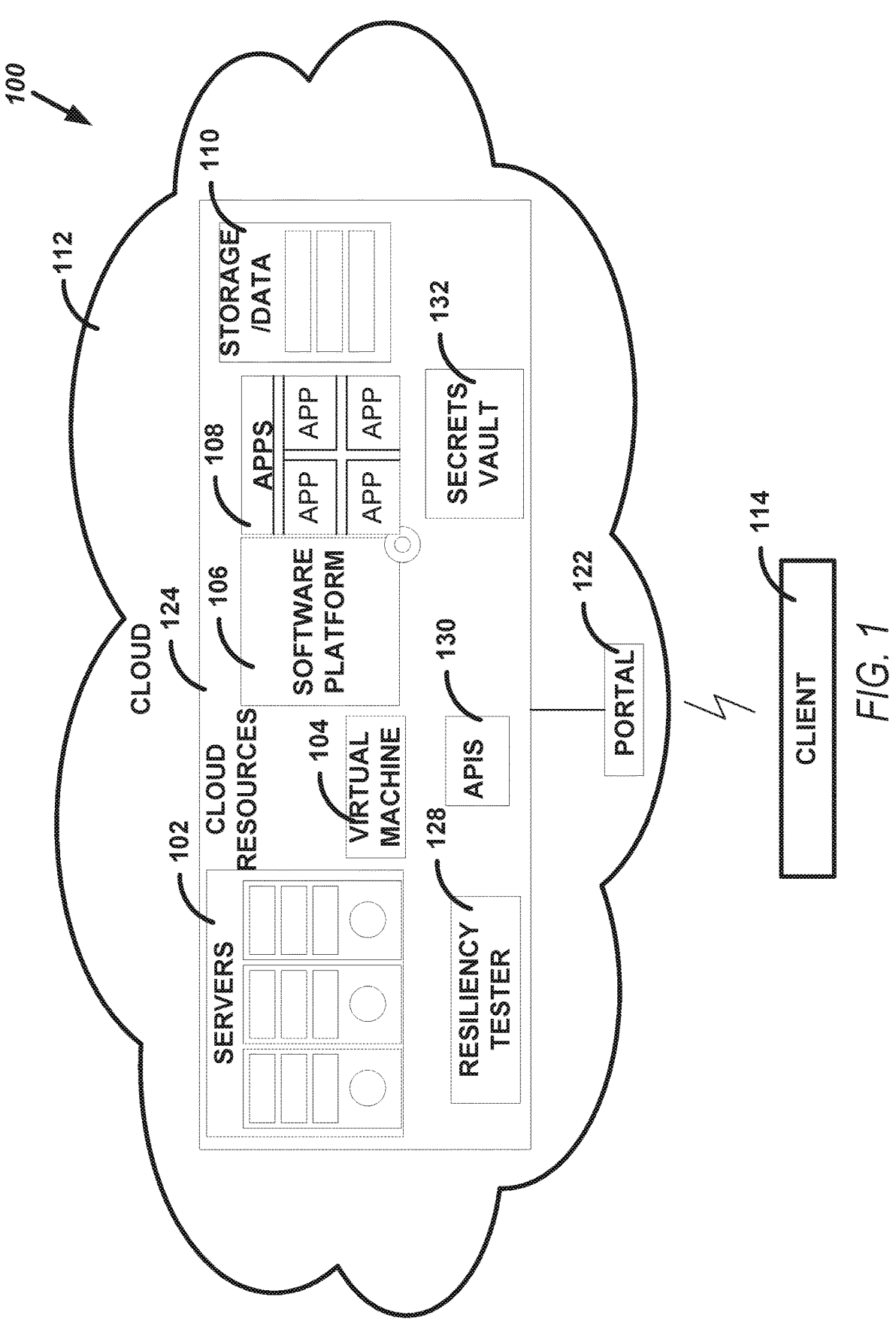
FIG. 1 illustrates, by way of example, a diagram of an embodiment of a cloud service system with resiliency testing.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Cloud users often deploy multiple cloud resources to form a system of cloud resources and access resources for their purposes. These systems are vulnerable to many errors or undesirable effects. To help mitigate security risks, cloud providers, offer product resiliency testing using chaos engineering.

Chaos engineering is a practice that helps identify vulnerabilities and validate quality and resiliency of cloud applications. Chaos engineering uses fault injection to help identify vulnerabilities and quantify resiliency. Fault injection is a practice of deliberately introducing a fault into a system. A fault is injected and a response of the system under test (SUT) is recorded. Any undesirable responses can be flagged and addressed.

Chaos engineering can be carried out using dispersed resiliency tools. Example dispersed resiliency tools include the open source Chaos Monkey and Compliance Gorilla (jointly the Simian Army), Gremlin from Gremlin of Covina, California, United States, Fault Injection Simulator from Amazon Warehouse Services (AWS) of Seattle, Washington, United States. Embodiments provide functionality of the dispersed resiliency tools, plus additional functionality, into a single tool. Embodiments thus provide testing for vulnerabilities or resiliency in a manner that was not previously possible. By providing functionality of each of the resiliency tools, in addition to other functionality, as faults in a library, a user can call faults and test their SUTs as they desire.

Current solutions to certificate resiliency testing include manually writing code to execute a lot of experiments and executing the code on a produced product (customer solution 222). These manual solutions are prone to human error and oversight and may miss certain important scenarios.

An error that is thrown from an application that is attempting to access a certificate that is disabled is provided below. Such an error can cause application operation outages, customer dissatisfaction, and can even cause an agreed to service level agreement (SLA) term to be breached. Using current solutions, service teams do not have a seamless way to test certificate-related code for failure scenarios.

This an the example certificate unavailability exception:

```
An unhandled exception occurred while processing the request.
AggregateExcept ion: One or more errors occurred. (Operation get is
not allowed on a disabled secret.
  Status: 403 (Forbidden)
  ErrorCode: Forbidden
  Content: {"error":{"code":"Forbidden","message":"Operation get is not
allowed on a disabled secret. ", "innererror":{"code":"SecretDisabled"}}}
  Headers:
  Cache-Control: no-cache
  Pragma: no-cache
  x-ms-keyvault- region: eastus
  x-ms-d ient- request- id: 4b42f103-44da-4c39-8296-38b13b8857ee
  x-ms-request-id: OS add b22 -353f-4951-bc19-c2d0001 b0e21
  x-ms-keyvault-service-version: 1.9.736.1
  x-ms-keyva ult-network- info: conn_type= lpv4; add r=
70.187.164.161;act_addr_fam = InterNetwork;
  X-Content-Type-Options: REDACTED
  Strict-Transport-Security: REDACTED
  Date: Tue, 07 Mar 2023 21 :40:36 GMT
  Content-Length: 132
  Content-Type: application/json; charset= utf-8
  Expires: -1
  )
  System.Threading.Tasks.Task.ThrowlfExceptional[bool
includeTaskCanceledExceptions)
  RequestFailed Exception: Operation get is not allowed on a disabled
secret.
  Status: 403 (Forbidden)
  ErrorCode: Forbidden
```

Embodiments solve one or more of the issues from manual writing of certificate testing code. Embodiments can include aggregating faults into a library of faults. The library of faults includes certificate-related faults that can be executed to test certificate management of a customer solution. A user can log into a cloud network, call a resiliency, design an experiment that calls one or more of the certificate-related faults, and test their certificate management tool using the experiment. Advantageously, the user does not need to write error-prone code and can instead rely on a more comprehensive and accurate analysis of the certificate management tool. Further, by calling some of the certificate-related faults, the user can help ensure that their certificate management tool abides by current certificate management best practices.

Certificate resiliency use cases that are handled by embodiments and not solved by prior solutions include a certificate being unavailable. Consider the following certificate unavailability scenarios that are solved by embodiments:

Alice is a Site Reliability Engineering (SRE) Director for a mission critical compute platform. Her team uses a certificate manager (e.g., AWS Certificate Manager, Azure Key Vault, or Hashicorp Vault, among others) to manage their secrets and certificates. The certificate manager is sometimes called a "secrets vault". Alice would like to know how her product reacts and recovers when a certificate or all of certificates are unavailable for a period of time. Alice would also like to know how her products react and recover when a certificate is unavailable combined with regular operations like deployments, restarts, patching, or the like. Alice then sees, upon implementing cyber resiliency, witnesses micro service crashes on restarts due to startup logic dependency on the service rather than using certificates on the disk, bad error codes and message sent back to the customers, data inconsistency problems as the good path is being interrupted and unable to recover without manual intervention among other issues.

Bob is a Software Engineering (SWE) manager for a storage service. His team uses a certificate manager to manage their secrets and certificates. Bob and team recently reviewed an incident where a networking change resulted in a storage service unable to reach the certificate manager. After the networking fix, the service required a manual intervention as the retry logic gave up after a number of retries. Embodiment would help prove a fix works as expected and subsequent changes will not break this scenario by replicating the scenario.

Carol is an SWE for a high traffic product that is yet to be generally available. Her team uses a certificate manager to manage their secrets and certificates. Carol and team, prior to the release of their product, would like to understand if their design can handle a high volume of usage. Their product is dependent on a certificate management service to which their product has to connect for every new request. They would like to know how their product operates when the certificate management service is partial or fully degraded. The validation pre, during, and post degradation is quite important to watch for bugs under seldom executed code paths.

Consider the following certificate subject name and issuer validation scenario that is solved by embodiments:

John is a developer on team management plane. His team uses a certificate manager to manage their certificates. They have been informed that the best practice to use certificates is to depend on only the subject name and issuer validation where the issuer is present in the trusted issuers list. John currently does not have a seamless way to test this out. To test the code he has written to validate the certificate he needs to set up the certificate manager and then generate several test certificates that he can use to test his code. This process is tedious and is not scalable as he and the rest of the teams in the organization need to do this every time he needs to test code. Embodiments allow a user to perform these operations in a scalable manner and with much less tedious work. Embodiments allow a user to call experiments that operate using subject name and issuer validation fault.

Consider the following certificate attributes fault scenario that is solved by embodiments:

Jane is a developer on a team core platform. Her team uses a certificate manager to manage their certificates. The team has been informed that the best practice when consuming certificates is to ensure that teams are only dependent on subject name, issuer of the certificate if the certificate is valid. This means that the team should remove any dependency on any other attributes of the certificate. To test this Jane sets up a test with the certificate manager and then generates several manually generated certificates with different combinations of attributes to ensure that the code can be tested rigorously for all or a large portion of certificate related attributes.

An "experiment" is an orchestrated set of faults. The faults or an experiment are heterogeneous or homogenous. The faults are temporally organized to achieve an effect. The experiment is then released on the cloud resource environment and the effect of the experiment is recorded. A fix for any undesired effects can then be engineered and deployed. The fix can then be validated to fix the error or undesirable effect caused by the fault before a next iteration of the product is released to the customer for consumption.

FIG. 1 illustrates, by way of example, a diagram of an embodiment of a cloud service system 100. The system 100 as illustrated includes a cloud infrastructure 112 and a client 114. The cloud infrastructure 112 includes computing resources 124 which the client 114 can access for their own computing needs. The computer devices as illustrated include servers 102, virtual machines 104, software platform 106, applications 108, storage/data 110, portal 122, resiliency tester 128, APIs 130, and secrets vault 132.

The cloud service system 100 can provide cloud computing services to various computing systems, such as desktops, laptops, tablets, smartphones, embedded computers, point-of-sale terminals, and so on. The cloud service system 100 can include cloud resources 124 that includes for example, servers 102 and storage devices 110 as well as various software products such as operating systems, databases, applications 108, application programming interfaces (APIs) 130, secret management (e.g., certificate management, passcode management, bio-print management, or a combination thereof), a combination thereof, or the like.

Rather than maintaining their own data centers, many enterprises (cloud customers) subscribe as customers of a database service of the cloud service system 100 to store and process their data. For example, a retail company can subscribe to a database service to store records of the sales transactions of the company and use an interface provided by the database service to run queries to help in analyzing the sales data. As another example, a utility company can subscribe to a database service for storing meter readings collected from the meters of its customers. As yet another example, a government entity can subscribe to a database service for storing and analyzing tax return data of millions of taxpayers.

Enterprises that subscribe to the cloud service system 100 want data privacy, resiliency, vulnerability, and security assurances. Although the cloud service system 100 can employ many techniques to help preserve the privacy, resiliency, vulnerability, and security of customer data or other products, parties seeking to steal such customer data and are continually devising new techniques to access the data. Also, resiliency and vulnerability are often a byproduct of product configuration.

The cloud infrastructure 112 is a network of servers and other computer resources that are accessible through the Internet and provides a variety of hardware and software services. These resources are designed to either store and manage data (e.g., storage/data 110), run applications 108 (using virtual machines 104), manage customer secrets (e.g., using secrets vault 132), or deliver content or a service (e.g., through servers 102). Services can include streaming videos, web mail, office productivity software, or social media, among others. Instead of accessing files and data from a local or personal computer, cloud data is accessed online from an Internet-capable device, such as client 114. Using the illustrated cloud infrastructure 112, a user can perform resiliency and vulnerability testing using a resiliency tester 128.

A user of the client 114 can perform an action (e.g., access, generate, or deploy) on or using one or more resources 124 of the cloud infrastructure 112. To perform an action on the resources 124, the user can first log into a portal 122. Logging into the portal 122 can include providing a username, password, two-factor authentication, or the like. The user can then generate one or more cloud resources 124, move one or more cloud resources 124, connect one or more cloud resources 124 to each other, alter an access or security policy for one or more cloud resources 124, or the like.

The servers 102 can provide results as a result of a request for computation. The server 102 can be a file server that provides a file in response to a request for a file, a web server that provides a web page in response to a request for website access, an electronic mail server (email server) that provides contents of an email in response to a request, a login server that provides an indication of whether a username, password, or other authentication data are proper in response to a verification request.

The virtual machine (VM) 104 is an emulation of a computer system. The VM 104 provides the functionality of a physical computer. VMs can include system VMs that provide the functionality to execute an entire operating system (OS) or process VMs that execute a computer application in an isolated, platform-independent environment. VMs can be more secure than a physical computer as an attack on the VM is merely an attack on an emulation. VMs can provide functionality of first platform (e.g., Linux, Windows, or another OS) on a second, different platform.

The software platform 106 is an environment in which a piece of software is executed. The software platform 106 can include hardware, OS, a web browser and associated APIs 130, or the like. The software platform 106 can provide tools for developing more computer resources, such as software. The software platform 106 can provide low-level functionality for a software developer.

The applications 108 can be accessible through one of the servers 102, the VM 104, a container, or the like. The applications 108 provide compute resources to a user such that the user does not have to download or execute the application on their own computer. The applications 108, for example, can include a machine learning (ML) suite that provides configured or configurable ML software. The ML software can include artificial intelligence type software, such as a neural network (NN) or other technique. The ML or AI techniques can have memory or processor bandwidth requirements that are prohibitively expensive or complicated for some cloud customers to implement or support.

The storage/data 110 can include one or more databases, containers, or the like for memory access. The storage/data 110 can be partitioned such that a given user has dedicated memory space. A service level agreement (SLA) generally defines an amount of uptime, downtime, maximum or minimum lag in accessing the data, or the like.

The cloud infrastructure 112 is accessible by any client 114 with sufficient permission. Usually a customer will pay for or otherwise gain permission to access the cloud infrastructure 112 using one or more devices.

The client 114 is a compute device capable of accessing the functionality of the cloud infrastructure 112. The client 114 can include a smart phone, tablet, laptop, desktop, a server, television or other smart appliance, a vehicle (e.g., a manned or unmanned vehicle), or the like. The client 114 accesses the resources provided by the cloud infrastructure 112. Each request from the client 114 can be associated with an internet protocol (IP) address identifying the client 114, a username identifying a user of the device, a customer identification indicating an entity that has permission to access the cloud infrastructure 112, or the like.

The resiliency tester 128 is a cloud resource that calls faults or experiments in a library of faults or experiments to test resiliency or vulnerability of another cloud resource. The resiliency tester 128 includes faults that can be configured to jointly implement an experiment that vets a product for resilience or a vulnerability.

The APIs 130 can include standard APIs, REST APIs, or the like. An API of the APIs 130 allows applications to communicate with each other. The API can interface between applications on a same device or between applications on different devices. An API is thus a set of definitions and protocols for building and integrating applications with each other. An API is sometimes called a contract between an information provider and an information user. For example, an API can specify that a first application provide first data and that a second application respond to the first data with second data.

A REST API is an API that conforms to the REST architectural style. A REST API, instead of transferring an input from a first application to a second application, transfers a representation of a state of the first application to the second application. The format of the representation is variable, such as Javascript object notation (JSON), hypertext markup language (HTML), extensible markup language representation of lexicons and terminologies (XLT), Python, hypertext preprocessor (PHP), plaintext, or the like.

The secrets vault 132 is a hardware device that provides a hardware solution for safe and secure secret (e.g., password, biometric data, certificate, or the like) storage and retrieval. The secrets vault 132 can implement hardware encryption on the secrets stored thereon.

The resiliency tester 128 provides certificate type resiliency testing. For example, certificate type resiliency testing can include one or more of a certificate unavailable fault, a subject name and issuer validation fault, or a certificate attribute fault. In implementing the certificate unavailable fault, the resiliency tester can execute an experiment that issues a request to the secrets vault 132 that changes a parameter of a certificate from "valid" to "invalid" or something equal like "available" to "unavailable". Then, a cloud resource of the cloud resources 124 can attempt to access the certificate while the certificate is unavailable. The effect of the unavailable certificate can then be monitored and recorded. This example is a singular instance example and can be scaled easily using the resiliency tester 128 to include more certificate unavailable faults and subject name and issuer validation faults.

In another example, a subject name and issuer validation fault can be tested using the resiliency tester 128. Consider a product that uses certificate rotation. Using certificate rotation, a certificate is valid for only a limited amount of time. To test whether a product is resilient to certificate rotation, a thumbprint and version of a certificate can be altered, such as by issuing one or more requests through one or more of the APIs 130. Changing the thumbprint and the version of the certificate simulates the rotation of the certificate to a new certificate. Then, a cloud resource of the cloud resources 124 can attempt to access the new certificate. The effect of the new certificate validation can then be monitored and recorded. This example is also a singular instance example and be scaled easily to include more subject name and other faults, whether certificate related faults or not.

In yet another example, a certificate attribute fault can be tested. Some users have certificate testing that does not use a best practice of certificate testing based on only certificate validity, subject name, and issuer of the certificate (if the certificate is valid). The resiliency tester 128 can adjust values of different attributes of a certificate to be accessed by the cloud resource 124. Then, the cloud resource 124 can attempt to operate based on the certificate with its attributes changed. The effect of the certificate with its attributes can then be monitored and recorded. Any undesired effects can then be mitigated as needed or desired. This example is also a singular instance example and be scaled easily to include more subject name and other faults, whether certificate related faults or not. Other certificate related faults include the secrets vault 132 being unavailable, and such a scenario is also testable using embodiments.

Using the system 100, one can set standards or best practices to be followed by those operating within the system 100. The system 100 provides a centralized platform that every user can use on day-to-day basis in a seamless fashion to perform certificate resiliency validation.

For a class of problems in which code development and testing deal with certificate management, the following best practices can be followed. Whenever a certificate is requested from the certificate manager:

(1) Rely on only Subject Name+Issuer Validation for certificate validation: The subject name should match what a development team intends the certificate to have, and the issuer can be any issuer from the approved issuers list.

(2) Do not rely on the validity period of the certificate: The validity period of the certificate can be anything if the issuer is able to issue such a certificate. Service teams benefit from consumption without any manual intervention.

(3) Do not rely on Key size, Content Type, Certificate Name, Key Type of the certificate: The certificate attributes like key size, content type, certificate name, key type should not affect the consumption of the certificate by the service teams.

For another class of problems, in which a validation of service resiliency is tested during certificate management platform unavailability or degradation, the system 100 provides a capability in which services can replicate partial or full unavailability of the secrets vault 132, validate their product behavior, and revert to full availability of the secrets vault 132. The system 100 also provides integration with services telemetry pre, during and post testing. This allows teams to make the resiliency tests part of their deployment process to benchmark and bless their bits before releasing to production. Telemetry data is provided by a network monitor of the cloud network. Telemetry data is data collected from the cloud environment that regards the health, availability, performance, and security of the network and its components. Telemetry data in the context of certificate management can include throughput, bandwidth, number of operations per unit time, number of certificate access errors (e.g., per number of attempts), number of certificate retries, counts on specific certificate access errors, a combination thereof, or the like.

Figure 2:
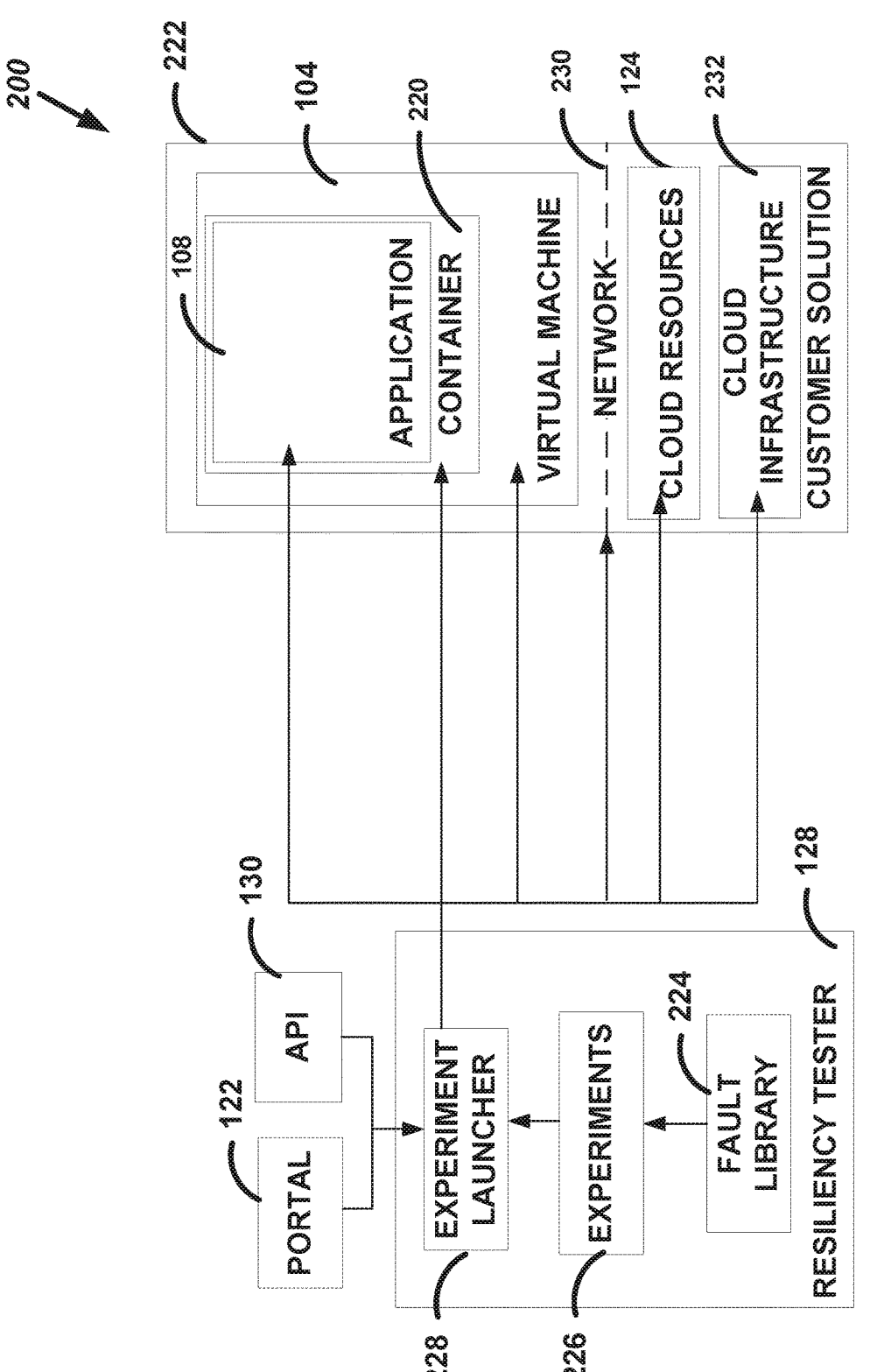
FIG. 2 illustrates, by way of example, a diagram of an embodiment of a resiliency tester system.

FIG. 2 illustrates, by way of example, a diagram of an embodiment of a resiliency tester system 200. The system 200 as illustrated includes the resiliency tester 128 and a customer solution 222 to be exercised by the resiliency tester 128. A user can access the resiliency tester 128 through an API 130 or the portal 122. The API 130 allows the user to access the resiliency tester 128 through another application. The portal 122 allows the user to directly access the resiliency tester 128. The user can then setup and deploy a chaos engineering experiment 226.

The user can define an experiment 226 that is a combination of faults from a fault library 224. Some of the faults in the fault library 224 have been presented previously, but can include a certificate unavailability fault, an issuer and subject name fault, a certificate attribute fault, a secrets vault availability fault, or a combination thereof, among others. Using the experiments, the user can test the reliability, resilience, and other important aspects of their certificate management systems. For example, the user can test whether there are any attributes that cause a problem with their certificate management system of their customer solution 222, whether the availability of the secrets vault affects the performance of the customer solution 222, whether a certificate rotation will affect the performance of the customer solution 222, among other resiliency tests.

The experiment launcher 228 issues the requests that implement an experiment of the experiments 226. The experiment launcher 228 accesses the defined experiment 226 and implements the defined fault(s) from the fault library 224 that are part of the experiment 226. The experiment launcher 228 communicates with the customer solution 222 to perform the experiment.

The experiment launcher 228 can communicate with a container 220 in which an application is executing. The container 220 is isolated to operation within the VM 104 and disconnected from the network 230 and other cloud resources 124 or cloud infrastructure 232. Using the container 220 allows a user to execute the application 108 in a controlled environment that does not have a negative impact on deployed cloud resources 124.

The experiment launcher 228 can issue a request to the application 108, container 220, VM 104, network 230, cloud resources 124, cloud infrastructure 232, a combination thereof, or the like. The experiment launcher 228 can issue a request to reconfigure or request an operation be performed by any of the components that are communicatively coupled to the experiment launcher 228.

The cloud infrastructure 232 is the components used for cloud computing, such as hardware, abstracted resources, storage, or other components used to build an execute a cloud component. The hardware of the cloud infrastructure 232 can include physical hardware across one or more geographic locations. The hardware can include networking equipment, switches, routers, firewalls, load balancers, storage arrays, backup devices, or servers. Virtualization connects servers together, dividing and abstracting resources to make the resources accessible to users. Software called a hypervisor operates on the hardware to abstract resources of the hardware, such as memory, computing power, and storage. Data may be stored across many disks in a single storage array. Storage management helps ensure that data is backed up properly and indexed for retrieval if a another storage component fails. The network 230 includes physical wires, switches, routers, and other equipment. Virtual networks are created using the network 230. The network 230 can be communicatively coupled to another network, such as the Internet or an intranet so that the customer solution 222 can be accessed remotely.

Using the resiliency tester 128, a user can test certificate code earlier in the lifecycle of a customer solution 222 than what is normally performed. Testing certificate code earlier in the customer solution 222 lifecycle allows the production team to avoid an outage that is due to certificate code after the customer solution 222 is deployed and before the code is accessible to the customer.

Figure 3:
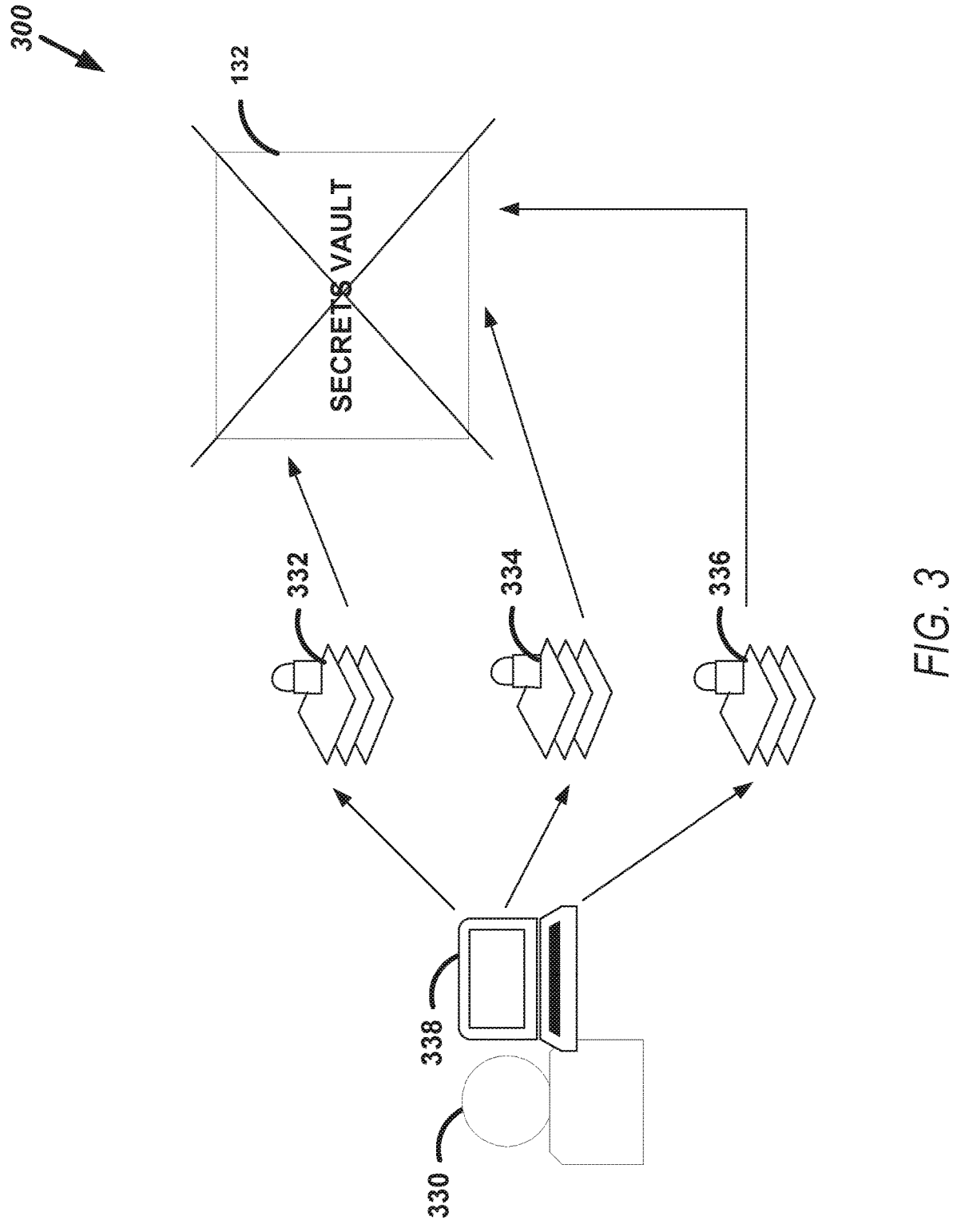
FIG. 3 illustrates, by way of example, a block diagram of an example of a secrets vault unavailable scenario enabled by embodiments.

FIG. 3 illustrates, by way of example, a block diagram of an example of a secrets vault unavailable scenario 300 enabled by embodiments. The scenario 300 as illustrated includes a user 330 that wants to test how well their application operates when the secrets vault 132 is inaccessible. The user 330 can log onto the cloud service that hosts the cloud resources 124, of which their application is one of the cloud resources 124. The user 330 can access the resiliency tester 128 and setup an experiment that tests how the application responds to the secrets vault 132 being unavailable. The experiment can include one or more faults, from the fault library 224, that inhibits access to the secrets vault 132. A secrets request 332, 334, 336 is thus prohibited from being satisfied through the secrets vault 132. The user 330 can then monitor how well the application operates under these conditions (e.g., before or after deployment of the application to the customer). If there is an issue to be resolved, the certificate handling code can be updated and re-tested using the same or similar scenario.

Figure 4:
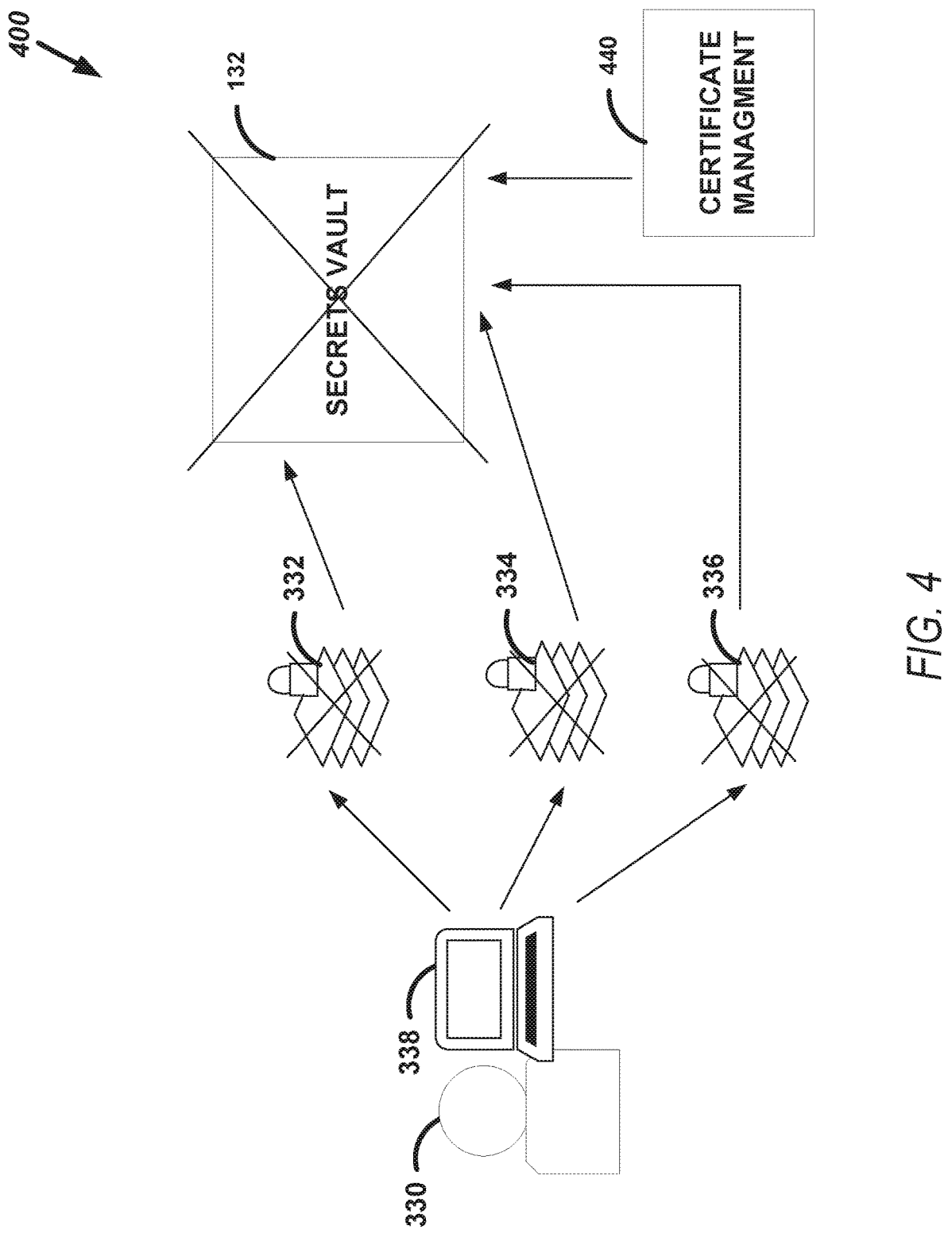
FIG. 4 illustrates, by way of example, a block diagram of an example of a certificate and secrets vault unavailable scenario enabled by embodiments.

FIG. 4 illustrates, by way of example, a block diagram of an example of a certificate and secrets vault unavailable scenario 400 enabled by embodiments. The scenario 400 as illustrated includes the user 330. The user 330 wants to test how well their application operates when a certificate, the secrets vault 132, or a combination thereof, is inaccessible. The user 330 can log onto the cloud service that hosts the cloud resources 124, of which their application is one of the cloud resources 124. The user 330 can access the resiliency tester 128 and setup an experiment that tests how the application responds to the secrets vault 132, certificate, or a combination thereof being unavailable. The experiment can include one or more faults, from the fault library 224, that inhibits access to the secrets vault 132, disable a certificate, or a combination thereof. A secrets request 332, 334, 336 is thus prohibited from being satisfied through the secrets vault 132. The user 330 can then monitor how well the application operates under these conditions (e.g., before or after deployment of the application to the customer). If there is an issue to be resolved, certificate management code 440 can be updated and re-tested using the same or similar scenario. The code tested can include a retry operation of the cloud management code 440.

Figure 5:
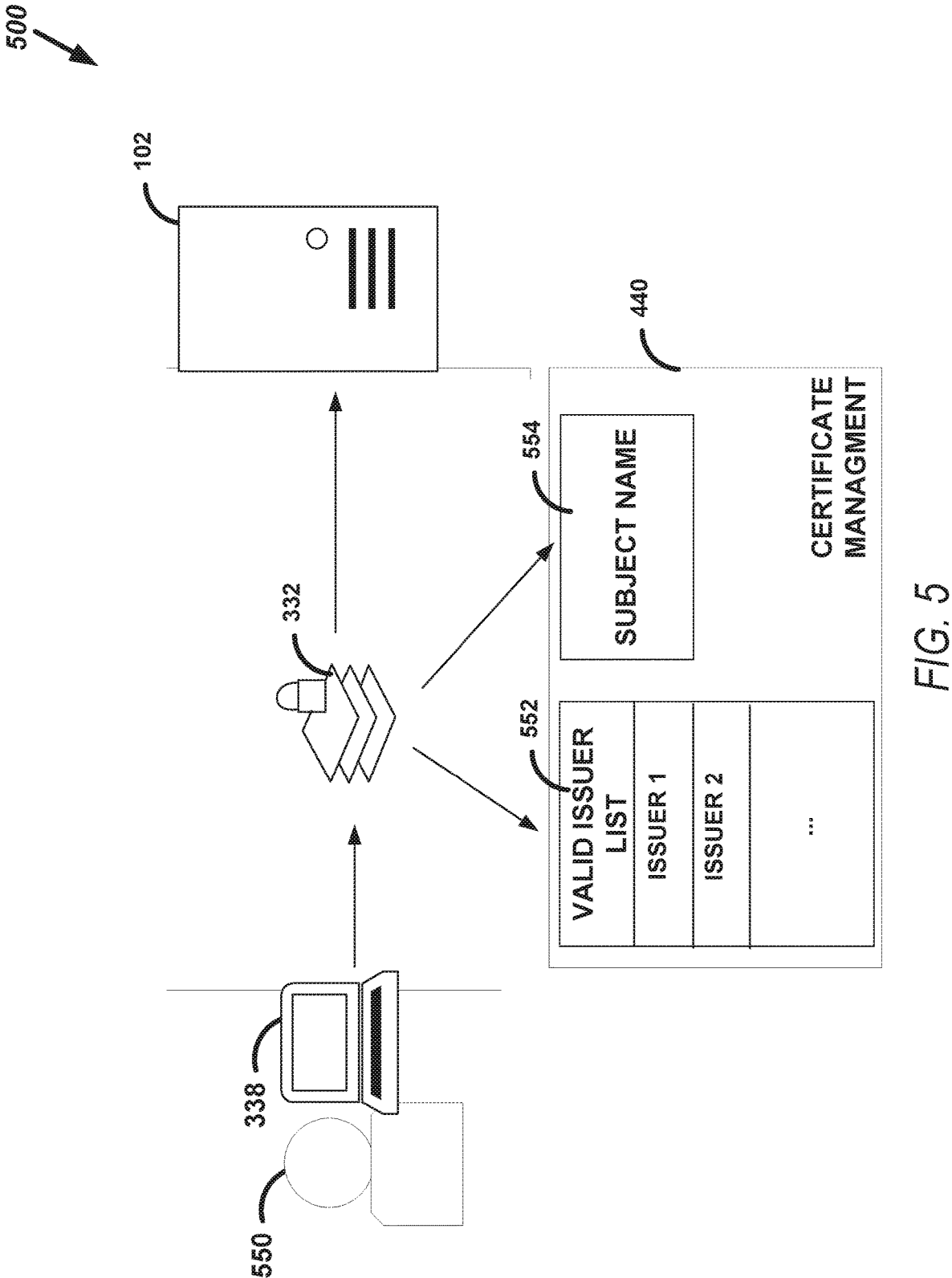
FIG. 5 illustrates, by way of example, a block diagram of an example of a certificate validation scenario enabled by embodiments.

FIG. 5 illustrates, by way of example, a block diagram of an example of a certificate validation scenario 500 enabled by embodiments. The scenario 500 as illustrated includes a user 550 that wants to test whether their certificate management code 440 operates on more than an issuer 552 and a subject name 554 of a certificate request 332. The user 550 can log onto the cloud service through the portal 122. The user 330 can access the resiliency tester 128 and setup an experiment that tests whether the application 108 hosted by server 102 response is based on more than a valid issuer 552 and valid subject name 554 or is based on more parameters. The experiment can include one or more faults, from the fault library 224, that alters a version of a certificate, for example, without altering the issuer or the subject name. A secrets request 332 can thus be verified as being satisfied based on only the issuer 552 and subject name 554. The user 330 can then monitor how well the application operates under these conditions (e.g., before or after deployment of the application to the customer). If there is an issue to be resolved, certificate management code 440 can be updated and re-tested using the same or similar scenario.

Figure 6:
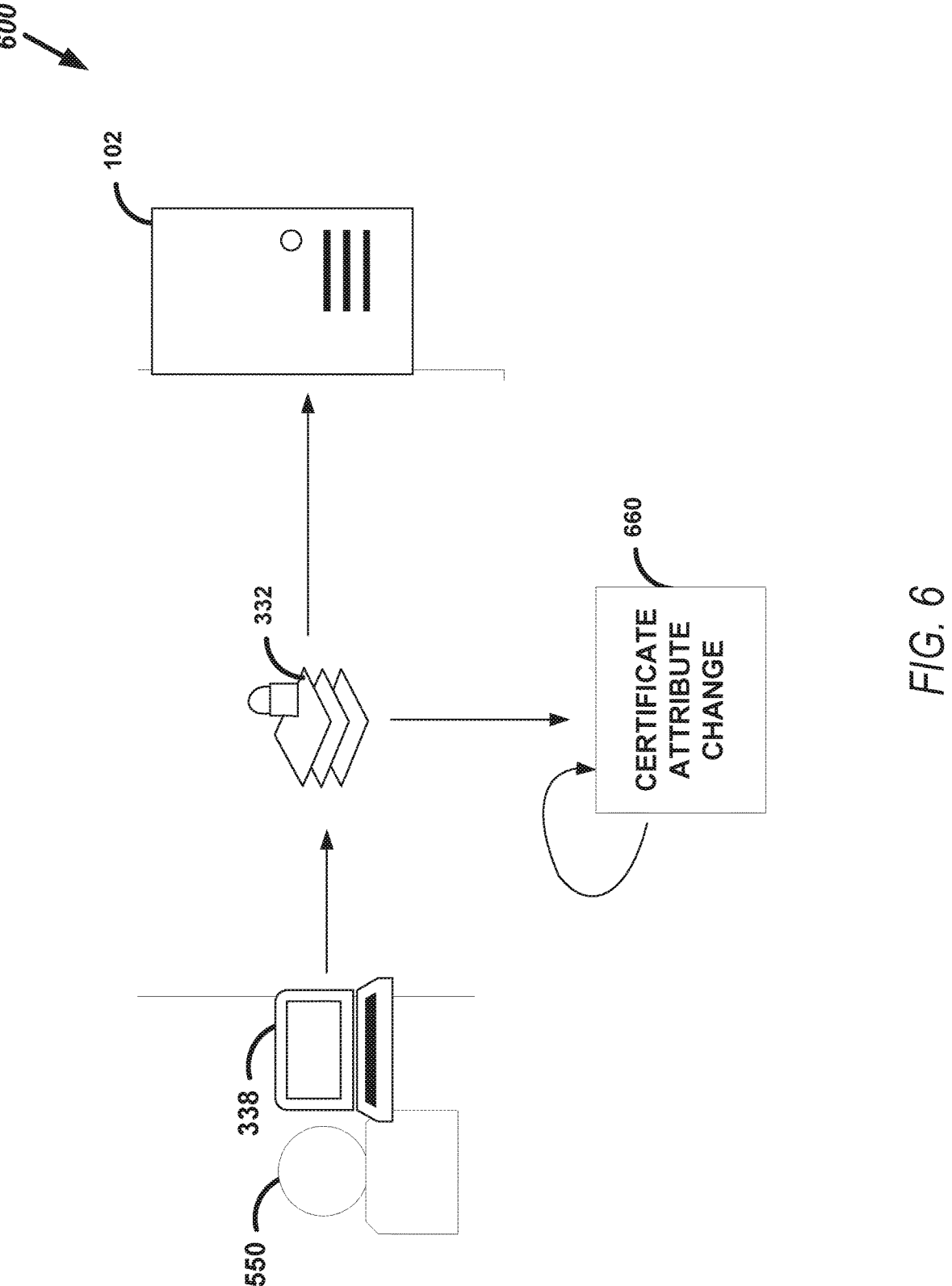
FIG. 6 illustrates, by way of example, a block diagram of an example of a certificate validation scenario enabled by embodiments.

FIG. 6 illustrates, by way of example, a block diagram of an example of a certificate validation scenario 600 enabled by embodiments. The scenario 600 as illustrated includes a user 550 that wants to test whether their certificate management code 440 operates based on any unnecessary attributes of a certificate request 332. The user 550 can log onto the cloud service through the portal 122. The user 330 can access the resiliency tester 128 and setup an experiment that tests whether the application 104 hosted by server 102 has certificate management based on any attributes. The experiment can include one or more faults, from the fault library 224 and implemented by a certificate attribute change fault 660, that alters an attribute of a certificate, for example, without altering the issuer or the subject name. It can thus be verified whether the secrets request 332 is satisfied based on any attributes other than the issuer 552 and subject name 554. The user 330 can then monitor how well the application operates under these conditions (e.g., before or after deployment of the application to the customer). If there is an issue to be resolved, certificate management code 440 can be updated and re-tested using the same or similar scenario.

FIG. 7 illustrates, by way of example, a block diagram of an embodiment of a method 700 for certificate management code validation. The method 700 as illustrated includes receiving, at a resiliency tester of a cloud network, experiment data defining a certificate management resilience experiment to be performed on a resource of the cloud network, at operation 770; accessing, by the resiliency tester and a fault library and based on the experiment data, one or more faults that implement the certificate management resilience experiment, at operation 772; altering, by the resiliency tester and based on the experiment data, an attribute of a certificate, a version of the certificate, accessibility to a secrets vault that houses the certificate, or a combination thereof resulting in a modified certificate or modified certificate availability, at operation 774; executing an application that operates using certificate management code that relies on access to the modified certificate or modified certificate availability, at operation 776; monitoring execution of the application, at operation 778; and altering the certificate management code based on the monitoring, at operation 780. Altering the certificate management code or tool can include removing any dependencies on certificate attributes that caused an error, any dependencies on certificate attributes other than subject name or issuer (being on an issuer whitelist or not on an issuer blacklist), or other dependencies that cause the certificate management to fail a resiliency test or otherwise does not abide by a defined best practice in certificate management.

The method 700 can further include, wherein the one or more faults comprise a disabled certificate fault. The method 700 can further include, wherein the one or more faults comprise a secrets vault unavailable fault. The method 700 can further include, wherein the one or more faults comprise a certificate attribute alteration fault. The method 700 can further include, wherein the certificate attribute fault alters a certificate attribute value. The method 700 can further include, wherein the certificate attribute comprises one or more of a key size, content type, certificate name, or key type of the certificate.

The method 700 can further include, wherein the one or more faults comprises a fault that alters a version number of the certificate. The method 700 can further include, wherein the one or more faults comprises a fault that alters a validity period of the certificate. The method 700 can further include, wherein the experiment ensures that certificate validation is performed based on only (i) whether an issuer is on a list of valid issuers and (ii) subject name of the certificate matches a pre-defined string.

Figure 8:
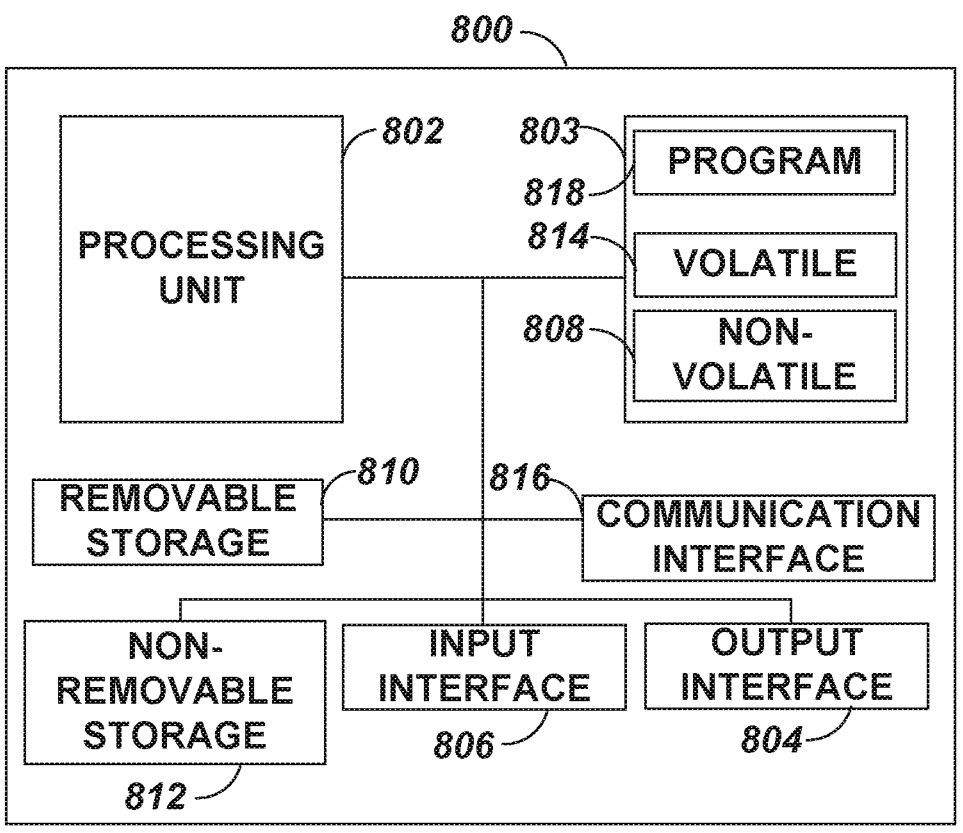
FIG. 8 illustrates, by way of example, a block diagram of an embodiment of a machine (e.g., a computer system) to implement one or more embodiments.

FIG. 8 illustrates, by way of example, a block diagram of an embodiment of a machine 800 (e.g., a computer system) to implement one or more embodiments. The machine 800 can implement a technique for improved cloud resource security. Any of the cloud resources 124, client device 114, resiliency tester 128, customer solution 222, certificate management tool 440, method 700 or a component or operation thereof can include one or more of the components of the machine 800. One or more of the cloud resources 124, client device 114, resiliency tester 128, customer solution 222, certificate management tool 440, method 700, or a component or operations thereof can be implemented, at least in part, using a component of the machine 800. One example machine 800 (in the form of a computer), may include a processing unit 802, memory 803, removable storage 810, and non-removable storage 812. Although the example computing device is illustrated and described as machine 800, the computing device may be in different forms in different embodiments. For example, the computing device may instead be a smartphone, a tablet, smartwatch, or other computing device including the same or similar elements as illustrated and described regarding FIG. 8. Devices such as smartphones, tablets, and smartwatches are generally collectively referred to as mobile devices. Further, although the various data storage elements are illustrated as part of the machine 800, the storage may also or alternatively include cloud-based storage accessible via a network, such as the Internet.

Memory 803 may include volatile memory 814 and non-volatile memory 808. The machine 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 800 may include or have access to a computing environment that includes input 806, output 804, and a communication connection 816. Output 804 may include a display device, such as a touchscreen, that also may serve as an input device. The input 806 may include one or more of a touchscreen, touchpad, mouse, keyboard, camera, one or more device-specific buttons, one or more sensors integrated within or coupled via wired or wireless data connections to the machine 800, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 802 (sometimes called processing circuitry) of the machine 800. A hard drive, CD-ROM, and RAM are some examples of articles including a non-transitory computer-readable medium such as a storage device. For example, a computer program 818 may be used to cause processing unit 802 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

ADDITIONAL NOTES AND EXAMPLES

Example 1 includes a method for certificate management resiliency testing, the method comprising receiving, at a resiliency tester of a cloud network, experiment data defining a certificate management resilience experiment to be performed on a resource of the cloud network, accessing, by the resiliency tester and a fault library and based on the experiment data, one or more faults that implement the certificate management resilience experiment, altering, by the resiliency tester and based on the experiment data, an attribute of a certificate, a version of the certificate, accessibility to a secrets vault that houses the certificate, or a combination thereof resulting in a modified certificate or modified certificate availability, and altering a certificate management tool based on telemetry data regarding access of the modified certificate.

In Example 2, Example 1 further includes, wherein the one or more faults comprise a disabled certificate fault.

In Example 3, at least one of Examples 1-2 further includes, wherein the one or more faults comprise a secrets vault unavailable fault.

In Example 4, at least one of Examples 1-3 further includes, wherein the one or more faults comprise a certificate attribute alteration fault.

In Example 5, Example 4 further includes, wherein the certificate attribute fault alters a certificate attribute value.

In Example 6, at least one of Examples 4-5 further includes, wherein the certificate attribute comprises one or more of a key size, content type, certificate name, or key type of the certificate.

In Example 7, at least one of Examples 1-6 further includes, wherein the one or more faults comprises a fault that alters a version number of the certificate.

In Example 8, at least one of Examples 1-7 further includes, wherein the one or more faults comprises a fault that alters a validity period of the certificate.

In Example 9, at least one of Examples 1-8 further includes, wherein the experiment ensures that certificate validation is performed based on only (i) whether an issuer is on a list of valid issuers and (ii) subject name of the certificate matches a pre-defined string.

Example 10 includes a resiliency tester, and a memory coupled to the resiliency tester, the memory comprising instructions that, when executed by the resiliency tester, cause the resiliency tester to perform operations for certificate management resiliency testing, the operations comprising receiving experiment data defining a certificate management resilience experiment to be performed on a cloud resource, accessing, by a fault library and based on the experiment data, one or more faults that implement the certificate management resilience experiment, altering, based on the experiment data and during execution of the certificate management resilience experiment, an attribute of a certificate and, accessibility to a secrets vault that houses the certificate, resulting in a modified certificate and modified certificate availability, executing an application that operates using certificate management code that relies on access to the modified certificate or modified certificate availability, monitoring execution of the application, and altering the certificate management code based on the monitoring.

In Example 11, Example 10 further includes, wherein the one or more faults comprise a disabled certificate fault.

In Example 12, at least one of Examples 10-11 further includes, wherein the one or more faults comprise a secrets vault unavailable fault.

In Example 13, at least one of Examples 10-12 further includes, wherein the one or more faults comprise a certificate attribute alteration fault.

In Example 14, Example 13 further includes, wherein the certificate attribute fault alters a certificate attribute value.

In Example 15, Example 14 further includes, wherein the certificate attribute comprises one or more of a key size, content type, certificate name, or key type of the certificate.

Example 16 includes a non-transitory machine-readable medium including instructions that, when executed by a machine, cause the machine to perform operations for certificate management resiliency testing of a certificate management tool that manages certificates of a cloud resource, the operations comprising receiving experiment data defining a certificate management resilience experiment to be performed on the cloud resource, accessing, by a fault library and based on the experiment data, one or more certificate-related faults that implement the certificate management resilience experiment, altering, based on the experiment data, an attribute of a certificate, a version of the certificate, or a combination thereof resulting in a modified certificate in accord with the one or more certificate-related faults, executing an application that operates using the certificate management tool, monitoring execution of the application, and altering the certificate management tool based on the monitoring.

In Example 17, Example 16 further includes, wherein the one or more certificate-related faults comprises a fault that alters a validity period of the certificate or a version number of the certificate.

In Example 18, at least one of Examples 16-17 further includes, wherein the experiment ensures that certificate validation is performed based on only (i) whether an issuer is on a list of valid issuers and (ii) subject name of the certificate matches a pre-defined string.

In Example 19, at least one of Examples 16-18 further includes, wherein the one or more certificate-related faults comprises two or more of a disabled certificate fault, a secrets vault unavailable fault, and an attribute alteration fault.

In Example 20, Example 19 further includes, wherein the certificate attribute fault alters a certificate attribute value, the certificate attribute comprises one or more of a key size, content type, certificate name, or key type of the certificate.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method for certificate management resiliency testing, the method comprising:

receiving, at a resiliency tester of a cloud network, experiment data defining a certificate management resilience experiment to be performed on a resource of the cloud network;

accessing, by the resiliency tester, a fault library and based on the experiment data to identify one or more certificate-related faults for implementing in the certificate management resilience experiment;

altering, by the resiliency tester during execution of the certificate management resilience experiment and based on the experiment data, an attribute of a certificate, a version of the certificate, and accessibility to a secrets vault that houses the certificate in accord with the one or more certificate-related faults, thereby producing a resulting in a modified certificate and modified certificate availability;

executing an application that operates using certificate management code, the certificate management code relies on access to the modified certificate and the modified certificate availability;

monitoring execution of the application to collect telemetry data regarding how the certificate management code responds to the modified certificate and the modified certificate availability; and altering the certificate management code based on the telemetry data regarding access of the modified certificate.

2. The method of claim 1, wherein the one or more faults comprise a disabled certificate fault.

3. The method of claim 1, wherein the one or more faults comprise a secrets vault unavailable fault.

4. The method of claim 1, wherein the one or more faults comprise a certificate attribute alteration fault.

5. The method of claim 4, wherein the certificate attribute alteration fault alters a certificate attribute value.

6. The method of claim 4, wherein the attribute of the certificate comprises one or more of a key size, content type, certificate name, or key type of the certificate.

7. The method of claim 1, wherein the one or more faults comprises a fault that alters a version number of the certificate.

8. The method of claim 1, wherein the one or more faults comprises a fault that alters a validity period of the certificate.

9. The method of claim 1, wherein the experiment ensures that certificate validation is performed based on only (i) whether an issuer is on a list of valid issuers and (ii) subject name of the certificate matches a pre-defined string.

10. A compute system of a cloud network comprising:

a resiliency tester;

a memory coupled to the resiliency tester, the memory comprising instructions that, when executed by the resiliency tester, cause the resiliency tester to perform operations for certificate management resiliency testing, the operations comprising:

receiving experiment data defining a certificate management resilience experiment to be performed on a cloud resource of the cloud network;

accessing, by a fault library accessible by the resiliency tester and based on the experiment data, one or more certificate-related faults that implement the certificate management resilience experiment;

altering, based on the experiment data and during execution of the certificate management resilience experiment, an attribute of a certificate, a version of the certificate, and accessibility to a secrets vault that houses the certificate, resulting in a modified certificate and modified certificate availability;

executing an application that operates using certificate management code that relies on access to the modified certificate and the modified certificate availability;

monitoring the execution of the application to collect telemetry data regarding how the certificate management code responds to the modified certificate and the modified certificate availability; and altering the certificate management code based on the monitoring and the telemetry data regarding access of the modified certificate.

11. The system of claim 10, wherein the one or more faults comprise a disabled certificate fault.

12. The system of claim 10, wherein the one or more faults comprise a secrets vault unavailable fault.

13. The system of claim 10, wherein the one or more faults comprise a certificate attribute alteration fault.

14. The system of claim 13, wherein the certificate attribute alteration fault alters a certificate attribute value.

15. The system of claim 14, wherein the attribute value of the certificate comprises one or more of a key size, content type, certificate name, or key type of the certificate.

16. A non-transitory machine-readable medium including instructions that, when executed by a machine, cause the machine to perform operations for certificate management resiliency testing of certificate management code that manages certificates of a cloud resource of a cloud network, the operations comprising:

receiving, at a resiliency tester of the cloud network, experiment data defining a certificate management resilience experiment to be performed on the cloud resource;

accessing, by a fault library accessible by the resiliency tester and based on the experiment data, one or more certificate-related faults that implement the certificate management resilience experiment;

altering, by the resiliency tester, based on the experiment data and during execution of the certificate management resilience experiment, an attribute of a certificate, a version of the certificate, and accessibility to a secrets vault that houses the certificate resulting in a modified certificate and modified certificate availability in accord with the one or more certificate-related faults;

executing an application that operates using the certificate management code that relies on access to the modified certificate and the modified certificate availability;

monitoring the execution of the application to collect telemetry data regarding how the certificate management code responds to the modified certificate and the modified certificate availability; and altering the certificate management code based on the monitoring and the telemetry data regarding access of the modified certificate.

17. The non-transitory machine-readable medium of claim 16, wherein the one or more certificate-related faults comprises a fault that alters a validity period of the certificate or a version number of the certificate.

18. The non-transitory machine-readable medium of claim 16, wherein the experiment ensures that certificate validation is performed based on only (i) whether an issuer is on a list of valid issuers and (ii) subject name of the certificate matches a pre-defined string.

19. The non-transitory machine-readable medium of claim 16, wherein the one or more certificate-related faults comprises two or more of a disabled certificate fault, a secrets vault unavailable fault, and a certificate attribute alteration fault.

20. The non-transitory machine-readable medium of claim 19, wherein the certificate attribute alteration fault alters a certificate attribute value, the attribute of the certificate comprises one or more of a key size, content type, certificate name, or key type of the certificate.

\* \* \* \* \*